United States Patent
Takeuchi et al.

(10) Patent No.: US 10,094,611 B2
(45) Date of Patent: Oct. 9, 2018

(54) HEAT MEDIUM CIRCULATION DEVICE

(71) Applicant: RINNAI CORPORATION, Nagoya-shi, Aichi (JP)

(72) Inventors: Shigeki Takeuchi, Aichi (JP); Ryosuke Yuge, Aichi (JP)

(73) Assignee: RINNAI CORPORATION, Nagoya-Shi (JP)

( * ) Notice: Subject to any disclaimer, the term of this patent is extended or adjusted under 35 U.S.C. 154(b) by 0 days.

(21) Appl. No.: 15/632,716

(22) Filed: Jun. 26, 2017

(65) Prior Publication Data

US 2018/0003426 A1 Jan. 4, 2018

(30) Foreign Application Priority Data

Jul. 1, 2016 (JP) .................................. 2016-131472

(51) Int. Cl.
| | | |
|---|---|---|
| *F24D 3/08* | (2006.01) | |
| *F25D 17/06* | (2006.01) | |
| *G05D 23/13* | (2006.01) | |
| *F24D 3/10* | (2006.01) | |
| *F24D 19/00* | (2006.01) | |

(52) U.S. Cl.
CPC ............ *F25D 17/06* (2013.01); *F24D 3/1091* (2013.01); *F24D 19/0095* (2013.01); *G05D 23/132* (2013.01); *F24D 2220/0221* (2013.01)

(58) Field of Classification Search
CPC .......... F24D 3/10; F24D 19/00; F24D 11/003; F24D 11/004; F24D 19/0095; F24D 3/08; F25B 41/00; Y02B 30/52
See application file for complete search history.

(56) References Cited

U.S. PATENT DOCUMENTS

| | | | | |
|---|---|---|---|---|
| 4,448,347 A * | 5/1984 | Dunstan | ................ | F25B 29/003 |
| | | | | 165/909 |
| 8,950,203 B2 * | 2/2015 | Giertz | ..................... | F25B 13/00 |
| | | | | 62/160 |
| 9,027,516 B2 * | 5/2015 | Park | ...................... | F24D 11/004 |
| | | | | 122/406.1 |
| 9,618,234 B2 * | 4/2017 | Komori | ..................... | F24D 3/08 |
| 9,689,588 B2 * | 6/2017 | Matsuura | .................. | F25B 1/10 |
| 9,951,962 B2 * | 4/2018 | Tamaki | ..................... | F24D 3/18 |
| 2018/0051894 A1 * | 2/2018 | Yoshida | .................... | F24D 3/08 |

FOREIGN PATENT DOCUMENTS

| | | |
|---|---|---|
| DE | 4112758 A1 | 10/1992 |
| DE | 10341741 A1 | 4/2005 |
| DE | 102012102931 A1 | 10/2013 |
| JP | 07-012402 | 1/1995 |
| WO | 2008/104016 A1 | 9/2008 |

OTHER PUBLICATIONS

European Search Report dated Nov. 8, 2017, 7 pages.

* cited by examiner

*Primary Examiner* — Gregory A Wilson
(74) *Attorney, Agent, or Firm* — Rankin, Hill & Clark LLP

(57) ABSTRACT

Provided is a heat medium circulation device with a simple structure, capable of reducing power consumption in performing an anti-freezing treatment. A first heat medium circuit 2 and a second heat medium circuit 3 are connected via a connector 5. An anti-freezing control unit 42 activates the first pump 22 with the second pump 32 in a stopped state, when preventing the heat medium in the first heat medium circuit 2 from freezing.

2 Claims, 2 Drawing Sheets

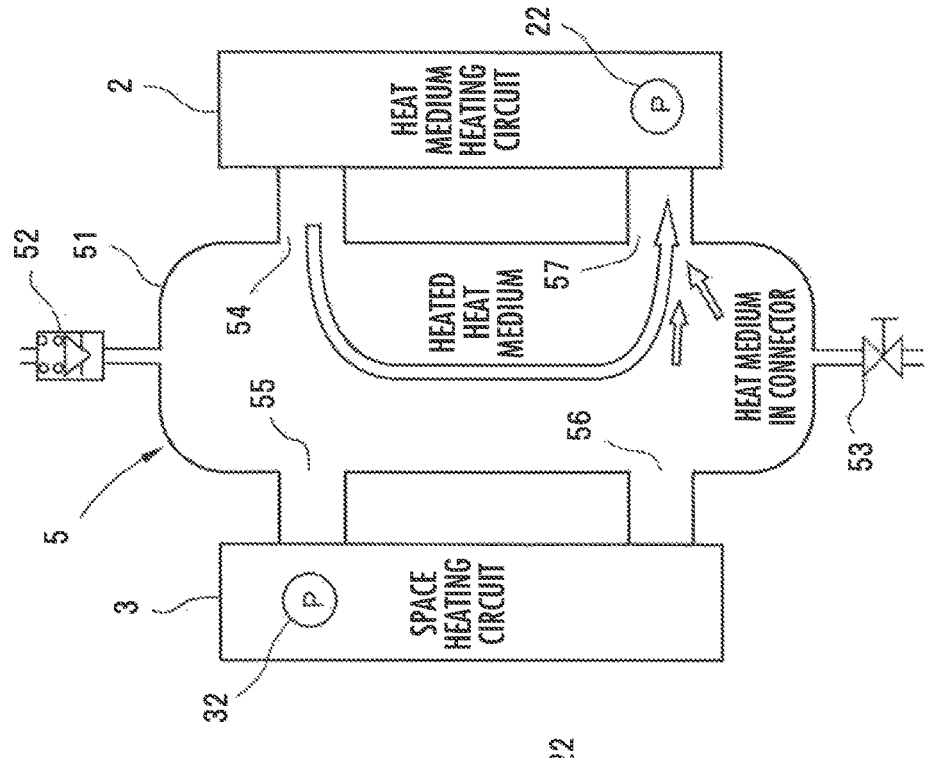
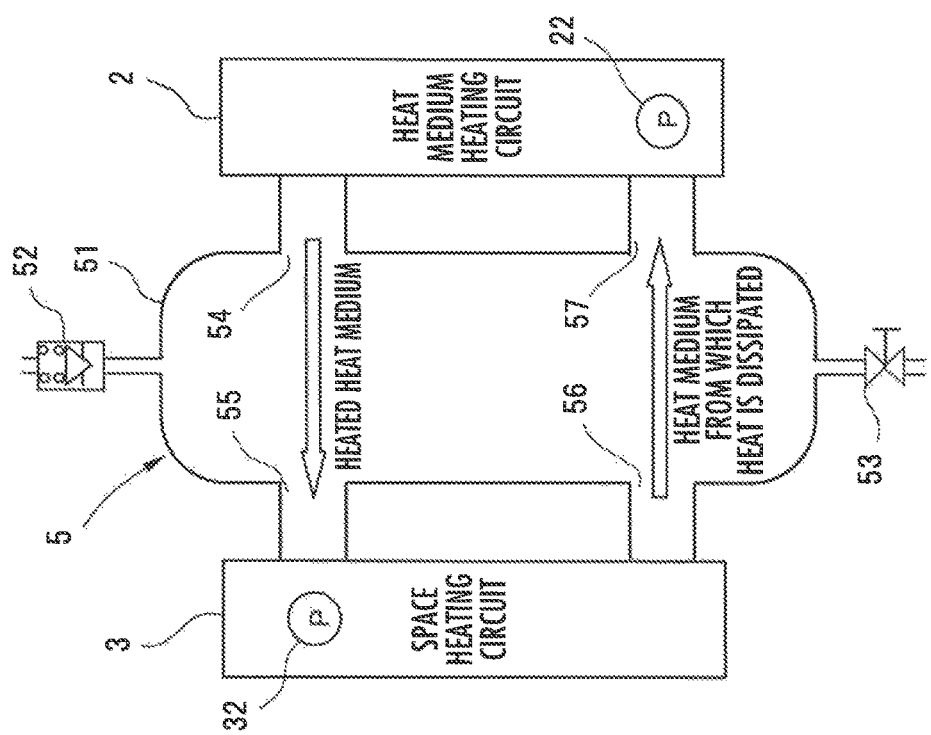

HEAT MEDIUM CIRCULATION DEVICE

BACKGROUND OF THE INVENTION

Field of the Invention

The present invention relates to a heat medium circulation device in which a first heat medium circuit having a heating unit, which heats a heat medium, is connected to a second heat medium circuit having a heat utilizing load which uses the heat of the heat medium.

Description of the Related Art

Conventionally, there has been known a hot water circulation device, which generates hot water by using a hot water boiler (a heating unit), and includes a hot water cylinder circulation circuit (a first heat medium circuit) which stores hot water in a hot water cylinder, and a hot water supply circulation circuit (a second heat medium circuit) having a hot water supply outlet such as a faucet.

In this circulation device, a first circulation pump provided in the hot water cylinder circulation circuit and a second circulation pump provided in the hot water supply circulation circuit are activated simultaneously to prevent water in both circuits from freezing (for example, refer to Japanese Patent Application Laid-Open No. H07-12402 [FIG. 3]).

In this type of circulation device, generally the second heat medium circuit is installed indoors, while the first heat medium circuit is installed outdoors. Thereby, the heat medium in the first heat medium circuit freezes due to a low outside air temperature in some cases, while the heat medium in the second heat medium circuit is unlikely to freeze since the heat medium is less affected by the outside air temperature.

In the above conventional device, however, the first circulation pump and the second circulation pump are activated together to circulate the heat medium in both of the first heat medium circuit and the second heat medium circuit. Thus, to prevent the heat medium in the first heat medium circuit from freezing, not only the first circulation pump of the first heat medium circuit, but also the second circulation pump of the second heat medium circuit is activated. Therefore, large electric power is consumed to prevent the heat medium from freezing disadvantageously.

SUMMARY OF THE INVENTION

The present invention has been made in view of the above background. It is therefore an object of the present invention to provide a heat medium circulation device capable of reducing power consumption when performing an anti-freezing treatment with a simple structure.

In order to achieve the above object, according to an aspect of the present invention, there is provided a heat medium circulation device including: a first heat medium circuit provided with a heating unit configured to heat a heat medium; a first pump provided in the first heat medium circuit to forcibly flow the heat medium from upstream to downstream of the first heat medium circuit; a second heat medium circuit which is provided with a heat utilizing load using the heat of the heat medium and is connected to the first heat medium circuit; a second pump provided in the second heat medium circuit to forcibly flow the heat medium from upstream to downstream of the second heat medium circuit; and a heat medium circulation control unit configured to synchronously activate the first pump and the second pump to circulate the heat medium between the first heat medium circuit and the second heat medium circuit in a case of using the heat of the heat medium by using the heat utilizing load, wherein a connector is provided between the first heat medium circuit and the second heat medium circuit to connect both circuits, wherein the connector includes: a body with an internal hollow formed by a cylindrical peripheral wall; a first inlet port which is formed in the body peripheral wall to introduce the heat medium from the first heat medium circuit to an inside of the body; a first outlet port which is formed in a position for receiving the heat medium, which is introduced from the first inlet port formed in the body peripheral wall, to deliver the heat medium from the inside of the body to the second heat medium circuit; a second inlet port which is formed in the body peripheral wall to introduce the heat medium from the second heat medium circuit into the inside of the body; and a second outlet port which is formed in a position for receiving the heat medium, which is introduced from the second inlet port formed in the body peripheral wall, to deliver the heat medium from the inside of the body to the first heat medium circuit, and wherein the heat medium circulation control unit includes an anti-freezing control unit configured to perform an anti-freezing treatment for preventing the heat medium in the first heat medium circuit from freezing by activating the first pump with the second pump in a stopped state.

According to the present invention, in the case of preventing the heat medium in the first heat medium circuit from freezing, the anti-freezing control unit activates the first pump with the second pump in the stopped state.

The connector which connects the first heat medium circuit and the second heat medium circuit to each other will be described here. The connector does not include a means for switching a flow path such as a switching valve. However, it is possible to switch the circulation flow path of the heat medium by controlling the activation and the stop of each of the first and second pumps. Note that the connector used in the present invention has the same configuration as that of a low loss header or a water mixing device which have already been known.

Specifically, when the heat medium is circulated in all of the first heat medium circuit and the second heat medium circuit, the first pump and the second pump are synchronously activated. Thereby, the heat medium heated by the heating unit is forcibly fed into the body from the first inlet port by the first pump in the connector. The heat medium fed into the body is forcibly sucked from the first outlet port by the second pump and then fed out to the second heat medium circuit.

Note that the internal space of the body is present between the first inlet port and the first outlet port and that the first outlet port is provided in a position for receiving the heat medium introduced from the first inlet port. Thereby, the heat medium fed into the body from the first inlet port moves smoothly toward the first outlet port and is delivered from the first outlet port. At this time, preferably the heat medium moves in a substantially linear manner.

On the downstream side of the second heat medium circuit, the heat medium from which heat is dissipated by the heat utilizing load is forcibly fed into the body from the second inlet port by the second pump. The heat medium fed into the body is forcibly sucked from the second outlet port by the first pump and then fed out to the first heat medium circuit.

The heat medium fed into the body from the second inlet port moves smoothly toward the second outlet port and then is delivered from the second outlet port. Also at this time, preferably the heat medium moves in a substantially linear manner.

Furthermore, when the connector activates the first pump while placing the second pump in the stopped state, the first pump forcibly feeds the heat medium in the first heat medium circuit into the body from the first inlet port. Furthermore, the heat medium in the body is fed out toward the upstream side of the first heat medium circuit from the second outlet port by the activation of the first pump.

In the second heat medium circuit, the heat medium does not flow almost at all due to the stopped state of the second pump. Accordingly, the heat medium heated by the heating unit is forcibly fed into the body from the first inlet port and moves inside the body. In this process, the heat medium is slightly mixed with an unheated heat medium in the body and then returns to the first heat medium circuit from the second outlet port.

In the present invention, the above effect of the connector enables the first pump to be activated with the second pump in the stopped state when preventing the heat medium in the first heat medium circuit from freezing, thereby enabling the power consumption of the second pump to be eliminated. Moreover, the connector eliminates the necessity of a switching valve or other parts to circulate the heat medium only in the first heat medium circuit, thus enabling a simple structure with low cost.

Furthermore, preferably the heat medium circulation device according to the present invention further includes a temperature sensor which detects an ambient temperature at a position where the first heat medium circuit is installed, and the anti-freezing control unit performs the anti-freezing treatment based on the temperature detected by the temperature sensor.

It is conceivable that the anti-freezing treatment is performed during the time periods when a decrease in the outside air temperature is expected. In this case, a timer is provided to perform the anti-freezing treatment during night in winter.

Even during night in winter, however, the outside air temperature is not always the same every day. Therefore, the use of the timer may lead to a useless execution of the anti-freezing treatment, by which the power consumption cannot be sufficiently reduced.

Therefore, in the present invention, the anti-freezing treatment is performed when the temperature sensor detects a temperature at which the heat medium is likely to freeze, where the temperature sensor is used to detect an ambient temperature at the position where the first heat medium circuit is installed. Thereby, the anti-freezing treatment is performed only in the case where the heat medium in the first heat medium circuit is likely to freeze and therefore the power consumption is able to be further reliably reduced.

BRIEF DESCRIPTION OF THE DRAWINGS

FIG. 2A is an explanatory diagram illustrating the movement of the heat medium inside the connector during a space heating operation; and FIG. 2B is an explanatory diagram illustrating the movement of the heat medium inside the connector during an anti-freezing treatment.

DESCRIPTION OF THE PREFERRED EMBODIMENTS

Figure 1:
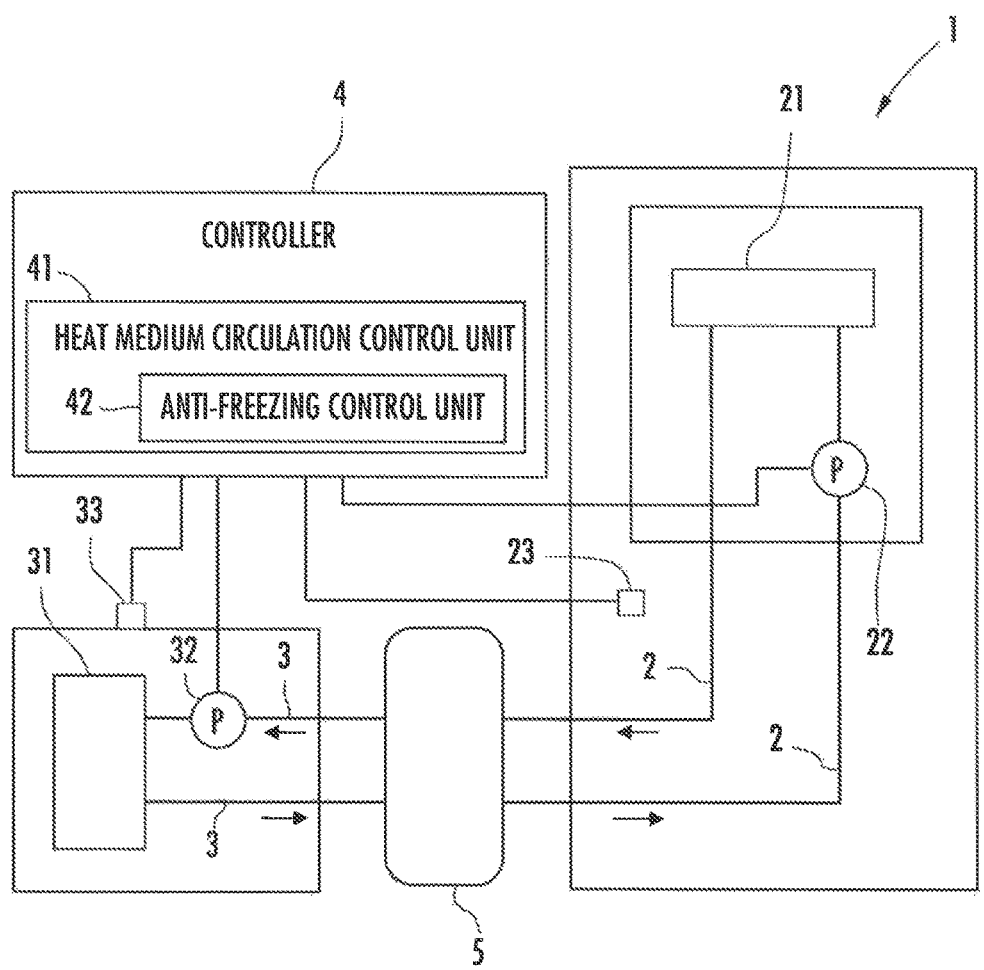
FIG. 1 is a diagram schematically illustrating the configuration of a heat medium circulation device according to one embodiment of the present invention.

One embodiment of the present invention will be described with reference to appended drawings. As illustrated in FIG. 1, a heat medium circulation device 1 according to this embodiment constitutes a hot water heating system which circulates water (hot water) as a heat medium. The heat medium circulation device 1 includes a heat medium heating circuit 2 (a first heat medium circuit) and a space heating circuit 3 (a second heat medium circuit).

The heat medium heating circuit 2 includes a heat source machine 21 as a heating unit for the heat medium. The heat medium heating circuit 2 includes a first pump 22 which forcibly flows the heat medium from upstream to downstream.

The space heating circuit 3 includes a space heating terminal 31 as a heat utilizing load. The space heating circuit 3 includes a second pump 32 which forcibly flows the heat medium from upstream to downstream.

The heat medium circulation device 1 is provided with a controller 4. The controller 4 has a function as a heat medium circulation control unit 41 which controls the circulation of the heat medium. The heat medium circulation control unit 41 controls the circulation of the heat medium by giving an instruction of activating the first pump 22 and the second pump 32.

The controller 4 collects temperature information from an outside air temperature sensor 23 (corresponding to a temperature sensor of the present invention) and a room temperature sensor 33. The outside air temperature sensor 23 is provided in a position of being able to detect the ambient temperature (the outside air temperature) of a place where the heat medium heating circuit 2 is installed. The room temperature sensor 33 is provided in a position of being able to detect the ambient temperature (the indoor temperature) of a place where the space heating circuit 3 is installed.

The heat medium circulation control unit 41 includes an anti-freezing control unit 42 as a function. The anti-freezing control unit 42 determines whether or not the heat medium in the heat medium heating circuit 2 or the heat medium in the space heating circuit 3 is likely to freeze on the basis of temperatures detected by the outside air temperature sensor 23 and the room temperature sensor 33. If the heat medium is likely to freeze, then, the heat medium circulation control unit 41 performs an anti-freezing treatment described later.

Most of the heat medium heating circuit 2 is installed outdoors. The space heating circuit 3 is installed indoors. Therefore, the heat medium in the heat medium heating circuit 2 is likely to freeze in cold regions or during winter. On the other hand, in the case where the space heating circuit 3 is installed in a basement or the like, the room temperature does not decrease to an extremely low level and therefore the heat medium in the space heating circuit 3 is unlikely to freeze.

The heat medium heating circuit 2 and the space heating circuit 3 are connected to each other via a connector 5.

The connector 5 generally has the same configuration as the configuration of a low loss header or what is referred to as "water mixing device." As illustrated in FIG. 2A, the connector 5 has a body 51 with an internal hollow formed by a cylindrical peripheral wall.

The body 51 has an air vent mesh, which is not illustrated, inside. An air vent valve 52 for releasing the internal pressure to atmosphere is provided at an upper closed end of the body 51. A drain cock 53 is provided at a lower closed end of the body 51.

A first inlet port 54, a first outlet port 55, a second inlet port 56, and a second outlet port 57 are formed in the peripheral wall of the body 51. The first inlet port 54 is connected to a downstream end of the heat medium heating circuit 2, and the first outlet port 55 is connected to an upstream end of the space heating circuit 3. The second inlet port 56 is connected to a downstream end of the space heating circuit 3, and the second outlet port 57 is connected to an upstream end of the heat medium heating circuit 2.

The first inlet port 54 and the first outlet port 55 are opposed to each other via an internal space of the body 51 apart. The second inlet port 56 and the second outlet port 57 are opposed to each other via an internal space of the body 51 apart.

Subsequently, a space heating operation will be described with reference to FIGS. 1 and 2A. When performing the space heating operation, the controller 4 controls the heat source machine 21 to heat the heat medium. The heat medium circulation control unit 41 synchronously activates the first pump 22 and the second pump 32 to supply the heat medium heated by the heat source machine 21 to the space heating terminal 31.

The heat medium heated by the heat source machine 21 of the heat medium heating circuit 2 is fed into the connector 5 from the downstream end of the heat medium heating circuit 2 by the activation of the first pump 22. The heated heat medium in the connector 5 is drawn toward the upstream side of the space heating circuit 3 from the connector 5 by the activation of the second pump 32.

In this process, regarding the movement of the heat medium inside the connector 5, the heated heat medium moves in a substantially linear manner from the first inlet port 54 to the first outlet port 55 and the heat medium from which heat is dissipated moves in a substantially linear manner from the second inlet port 56 to the second outlet port 57 as illustrated in FIG. 2A.

Thereby, the heat medium heating circuit 2 and the space heating circuit 3 form a continuous heat medium flow path and the heat medium circulates between the heat source machine 21 and the space heating terminal 31, by which a space heating operation is performed.

Subsequently, an anti-freezing treatment will be described with reference to FIGS. 1 and 2B. If a temperature detected by the outside air temperature sensor 23 decreases to a level lower than a predetermined temperature (for example, 2° C.) in a state where the space heating operation is stopped, the anti-freezing control unit 42 of the heat medium circulation control unit 41 requires an anti-freezing heat medium heating operation of the heat source machine 21. At the same time, the anti-freezing control unit 42 maintains the stop of the second pump 32 and activates the first pump 22.

In the above, the heat medium inside the connector 5 is moved by the activation of only the first pump 22. The activation of only the first pump 22 causes the heated heat medium in the heat medium heating circuit 2 to enter from the first inlet port 54 to the body 51, flows in the internal space of the body 51, and then returns from the second outlet port 57 to the heat medium heating circuit 2 as illustrated in FIG. 2B.

Since the second pump 32 is stopped in the space heating circuit 3, the circulating volume of the heat medium is extremely low. In the anti-freezing treatment, only the first pump 22 is activated without activation of the second pump 32 as described above, thereby enabling a reduction in power consumption and thus leading to a reduction in the operating sound by half.

Moreover, while moving toward the second outlet port 57 after being forcibly fed into the body 51, the heated heat medium involves a surrounding unheated heat medium and is mixed therewith, and then delivered from the second outlet port 57. Thereby, the temperature of the heat medium returned to the heat medium heating circuit 2 is suppressed from decreasing in comparison with the temperature of the heat medium having passed through the space heating circuit 3. Therefore, the energy consumption of the heat source machine 21 is able to be suppressed relatively low in the anti-freezing treatment.

Should the temperature detected by the room temperature sensor 33 is lower than a predetermined temperature (for example, 2° C.), the anti-freezing control unit 42 performs an anti-freezing treatment for the space heating circuit 3. In this case of the anti-freezing treatment, the first pump 22 and the second pump 32 are synchronously activated and the heated heat medium is circulated in both of the heat medium heating circuit 2 and the space heating circuit 3 similarly to the case of performing the space heating operation.

The heat medium circulation device which constitutes the hot water heating system has been described as the embodiment hereinabove. The present invention, however, is not limited thereto, and is preferably applicable to a device or the like having the configuration in which the first heat medium circuit provided with the heating unit is connected to the second heat medium circuit provided with the heat utilizing load via the connector. Specifically, although not illustrated, the present invention is also applicable to an anti-freezing treatment of a hot water supply system to which a hot water tank is connected.

Furthermore, this embodiment has been described by giving an example of the configuration of the connector 5 in which the first inlet port 54 and the first outlet port 55 are opposed to each other via the internal space of the body 51 and the second inlet port 56 and the second outlet port 57 are opposed to each other via the internal space of the body 51. The positional relationship, however, between the first inlet port 54 and the first outlet port 55 and the positional relationship between the second inlet port 56 and the second outlet port 57 are not limited thereto.

Specifically, the position of the first outlet port 55 relative to the first inlet port 54 and the position of the second outlet port 57 relative to the second inlet port 56 are able to be appropriately changed as far as the flow of the heat medium can be generated as illustrated in FIGS. 2A and 2B.

DESCRIPTION OF THE REFERENCE NUMERALS

1 Heat medium circulation device
2 Heat medium heating circuit (first heat medium circuit)
21 Heat source machine (heating unit)
22 First pump
23 Outside air temperature sensor (temperature sensor)
3 Space heating circuit (second heat medium circuit)
31 Space heating terminal (heat utilizing load)
32 Second pump
41 Heat medium circulation control unit
42 Anti-freezing control unit
5 Connector
51 Body
54 First inlet port
55 First outlet port
56 Second inlet port
57 Second outlet port

What is claimed is:

1. A heat medium circulation device comprising:
a first heat medium circuit provided with a heating unit configured to heat a heat medium;
a first pump provided in the first heat medium circuit to forcibly flow the heat medium from upstream to downstream of the first heat medium circuit;
a second heat medium circuit which is provided with a heat utilizing load using the heat of the heat medium;
a second pump provided in the second heat medium circuit to forcibly flow the heat medium from upstream to downstream of the second heat medium circuit;
a connector provided between the first heat medium circuit and the second heat medium circuit to connect both circuits; and
a heat medium circulation control unit configured to synchronously activate the first pump and the second pump to circulate the heat medium between the first heat medium circuit and the second heat medium circuit in a case of using the heat of the heat medium by using the heat utilizing load,
wherein the connector includes: a body with an internal hollow formed by a cylindrical peripheral wall; a first inlet port which is formed in the body peripheral wall to introduce the heat medium from the first heat medium circuit to an inside of the body; a first outlet port which is formed in a position for receiving the heat medium, which is introduced from the first inlet port formed in the body peripheral wall, to deliver the heat medium from the inside of the body to the second heat medium circuit; a second inlet port which is formed in the body peripheral wall to introduce the heat medium from the second heat medium circuit into the inside of the body; and a second outlet port which is formed in a position for receiving the heat medium, which is introduced from the second inlet port formed in the body peripheral wall, to deliver the heat medium from the inside of the body to the first heat medium circuit; and
wherein the heat medium circulation control unit includes an anti-freezing control unit configured to perform an anti-freezing treatment for preventing the heat medium in the first heat medium circuit from freezing by activating the first pump with the second pump in a stopped state.

2. The heat medium circulation device according to claim 1, further comprising a temperature sensor which detects an ambient temperature at a position where the first heat medium circuit is installed, wherein the anti-freezing control unit performs the anti-freezing treatment based on the temperature detected by the temperature sensor.

* * * * *